United States Patent [19]

Henderson et al.

[11] 3,872,071

[45] Mar. 18, 1975

[54] POLYMERS OF CONJUGATED DIENE HYDROCARBONS AND METHOD OF PREPARATION

[75] Inventors: James Neil Henderson, Hudson; Frank G. Shaheen, Canton, both of Ohio

[73] Assignee: The Goodyear Tire & Rubber Company, Akron, Ohio

[22] Filed: Apr. 5, 1974

[21] Appl. No.: 458,372

Related U.S. Application Data

[63] Continuation of Ser. No. 278,307, Aug. 7, 1972, abandoned, which is a continuation of Ser. No. 113,726, Feb. 8, 1971, Pat. No. 3,682,084, Continuation of Ser. No. 776,770, Nov. 18, 1968, abandoned.

[52] U.S. Cl.................................. 260/94.3, 260/82.1
[51] Int. Cl........ C08d 1/14, C08d 5/02, C08d 5/04
[58] Field of Search............ 260/94.3, 94.7 D, 96 D

[56] References Cited

UNITED STATES PATENTS

| | | | |
|---|---|---|---|
| 3,114,744 | 12/1963 | Lasky | 260/94.3 |
| 3,328,377 | 6/1967 | Cooper | 260/94.3 |

FOREIGN PATENTS OR APPLICATIONS

| | | | |
|---|---|---|---|
| 716,173 | 8/1965 | Canada | 260/94.3 |
| 1,468,700 | 1/1967 | France | 260/94.3 |

*Primary Examiner*—William F. Hamrock
*Attorney, Agent, or Firm*—F. W. Brunner; H. C. Young, Jr.

[57] ABSTRACT

Polymers of conjugated diene hydrocarbons and a method for their preparation which comprises (A) polymerizing the conjugated diene to form a polymer having substantially a trans-1,4 structure in the presence of a catalyst prepared by mixing a vanadium compound selected from vanadium trichloride and the product of vanadium tetrachloride and titanium tetrachloride with at least one organo aluminum compound and with up to 3 moles of a titanium compound per mole of vanadium compound where the titanium compound is selected from the group consisting of titanium triacetylacetonate and the compounds having the formula $Ti(OR')_4$ and (B) mixing oxygen with the polymerized diene hydrocarbon and catalyst to reduce the molecular weight of the polymer.

1 Claim, No Drawings

POLYMERS OF CONJUGATED DIENE HYDROCARBONS AND METHOD OF PREPARATION

This is a continuation of application Ser. No. 278,307 filed Aug. 7, 1972, now abandoned which is a continuation of application Ser. No. 113,726 filed Feb. 8, 1971, now U.S. Pat. No. 3,682,084 which is a streamline continuation of parent application Ser. No. 776,770 filed Nov. 18, 1968, now abandoned.

This invention relates to an improved method of preparing polymers of unsaturated hydrocarbons. More particularly, this invention relates to a method of modifying the molecular weight of polymers of unsaturated hydrocarbons of substantially a trans-1,4 structure and to the said modified polymers.

Various unsaturated hydrocarbons, particularly conjugated diene hydrocarbons, can be polymerized to form polymers. Many of the polymers have substantially a trans-1,4 structure. However, heretofore various conjugated diene hydrocarbons polymerized to form polymers of substantially a trans-1,4 structure have too high a molecular weight to process or fabricate easily or to be of commercial value for many applications.

Therefore, it is an object of this invention to provide an improved method of preparing polymers of unsaturated hydrocarbons. It is also an object to provide a method of modifying the molecular weight of polymers of conjugated diene hydrocarbons having substantially a trans-1,4 structure.

In accordance with this invention it was found unexpectedly that a method of preparing polymers of unsaturated hydrocarbons comprises (A) polymerizing at least one conjugated diene hydrocarbon to form a polymer having substantially a trans-1,4 structure in the presence of a catalyst prepared by mixing a vanadium compound selected from vanadium trichloride and the product of vanadium tetrachloride and titanium tetrachloride with at least one organo aluminum compound having the formula $R_3Al$, where R is a saturated hydrocarbon radical having from 3 to 6 carbon atoms, and (B) mixing oxygen with the polymerized diene hydrocarbon and catalyst to reduce the molecular weight of the polymer. If desired, the catalyst used for the polymerization of the diene can be modified by the addition of up to about 3 moles of a titanium compound per mole of vanadium compound where the titanium compound is selected from the group consisting of titanium triacetylacetonate and compounds having the formula $Ti(OR')_4$, generally referred to as tetrahydrocarbyl titanates, where R' is a saturated hydrocarbon radical having from 1 to 18 carbon atoms, to generally increase the polymerization rate.

Thus, it has been found unexpectedly that the addition of oxygen to the polymerization system after the diene hydrocarbons are polymerized to form polymers of substantially a trans-1,4 structure, and while the catalyst is still active, substantially reduces the inherent viscosity or molecular weight of the said polymer.

In conducting the polymerization reactions of this invention, polymers are generally prepared having from about 90 to about 100 percent of their structure oriented in a trans-1,4 configuration and having an inherent viscosity of from about 5 to about 12, as determined in benzene at 30°C., although higher or lower inherent viscosities can sometimes be obtained. It has surprisingly been found that the inherent viscosity of the prepared polymers can generally be reduced by at least 50 percent and usually at least 80 percent by the addition of oxygen to the mixture of polymer and catalyst. Usually the mol ratio of oxygen to the aluminum compound used is from about 0.25 to about 2.5 although preferably it is from about 0.5 to about 1.

In the practice of this invention various conjugated diene hydrocarbons can be used, generally having from 4 to about 10 carbon atoms and preferably from 4 to 6 carbon atoms. Representative examples of preferable conjugated diene hydrocarbons are those having the structure

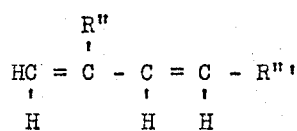

where R'' is hydrogen or a saturated hydrocarbon radical having from 1 to 6 carbon atoms and preferably from 1 to 2 carbon atoms.

For example, R'' can be selected from methyl, ethyl, propyl, isopropyl, butyl, s-butyl, t-butyl, pentyl, s-pentyl, t-pentyl, hexyl, s-hexyl and t-hexyl radicals, and where R''' is hydrogen or a methyl radical. Representative of the various diene hydrocarbons are 1,3-butadiene, 2-methyl-1,3-butadiene (isoprene), 2-ethyl-1,3-butadiene, 2-propyl-1,3-butadiene, 2-pentyl-1,3-butadiene, 2-hexyl-1,3-butadiene, and 1,3-pentadiene. The preferred diene hydrocarbons are 1,3-butadiene, 2-methyl-1,3-butadiene, 2-ethyl-1,3-butadiene and 1,3-pentadiene.

The preferred catalysts of this invention are those which produce polymers of conjugated diene hydrocarbons having substantially a trans-1,4 structure. Representative of organo aluminum compounds having the structure $R_3Al$ are trialkyl aluminum compounds, where R is a saturated alkyl radical having from 2 to 18 and preferably from 3 to 4 carbon atoms. For example, R can be selected from ethyl radicals, propyl radicals, isopropyl radicals, butyl radicals, isobutyl radicals, 2-ethylbutyl radicals, 2-ethylhexyl radicals, dodecyl radicals and octadodecyl radicals. Examples of the various trialkyl aluminum compounds are triethyl aluminum, tripropyl aluminum, triisopropyl aluminum, tributyl aluminum and triisobutyl aluminum. The preferred tialkyl aluminums are triisopropyl aluminum and triisobutyl aluminum.

Representative of various titanium compounds having the structure $Ti(OR')_4$, are those where R' is a saturated alkyl radical having from 1 to 18 carbon atoms, and preferably 3 to 4 carbon atoms, such as methyl, ethyl, propyl, isopropyl, butyl, isobutyl, 2-ethylbutyl, 2-ethylhexyl, dodecyl, and octadecyl radicals. The more preferred tetrahydrocarbyl titanates are titanium tetrahydrocarbyl titanate are titanium tetraisopropoxide, titanium tetrapropoxide, titanium tetra normal butoxide and titanium tetra isobutoxide.

In the catalyst preparation the mole ratio of the trialkyl aluminum ($R_3Al$) to the vanadium compound can vary over a wide range such as from about 1:1 to about 50:1. The mole ratios for the catalyst system prepared from $R_3Al$ and vanadium trichloride is preferred to be from about 1.5 to about 15; for the catalyst system prepared from $R_3Al$, vanadium tetrachloride, and titanium tetrachloride it is from about 5 to about 20; for the catalyst prepared from $R_3Al$, vanadium trichloride and titanium acetyl acetonate it is from about 5 to about 20 and for the catalyst prepared from $R_3Al$, vanadium trichloride and $Ti(OR')_4$ it is from about 10 to about 30. Thus, the more preferred mole ratio of $R_3Al$ to vanadium compound is from about 1.5:1 to about 30:1 and more preferably from about 2:1 to about 15:1.

If a titanium compound is utilized to prepare the catalyst, various amounts can be used which vary over a wide range such as a mole ratio of the titanium compound to the vanadium compound of up to about 4:1. A preferred ratio is from about 0.5:1 to about 2:1.

If the vanadium compound is prepared from vanadium tetrachloride and titanium tetrachloride, usually the mole ratio of titanium tetrachloride to vanadium tetrachloride is from about 0.5:1 to about 5:1 and preferably from about 0.75:1 to about 1.5:1.

The polymerization catalyst used in this invention can be prepared by direct mixing of the catalyst components. This may be done while the components are in contact with the monomer to be polymerized or by mixing in the absence of the monomer. The catalyst components may be mixed in bulk or they may be dissolved in an inert solvent and mixed as solutions. They can also be prepared by continuous catalyst make-up procedures. Generally, when the catalyst components are mixed in the absence of the monomer the activity of the resulting catalyst varies with temperature and with lapsed time after the components are mixed. For example, at 25°C. the polymerization activity of a catalyst prepared from triisobutyl aluminum, titanium triacetylacetonate and vanadium trichloride may increase to a maximum in about 15 to about 200 minutes and then slowly decline to a state of relative inactivity after about 10 to about 30 days. However, the activity of this catalyst may be preserved at a temperature of about −25°C. for a very long period of time.

It is usually preferred that the trialkyl aluminum and the titanium compounds, when used, are not brought together in the absence of the vanadium compound. It is further preferred that the vanadium trichloride is finely divided. The catalysts can be prepared over a wide range of temperatures such as from about 0°C. to about 150°C. and preferably from about 25°C. to about 70°C., except when the catalyst is prepared from titanium tetrachloride as the titanium compound, a catalyst preparation temperature of from about 90°C. to about 120°C. is preferred.

The catalyst is employed in a catalytic amount to polymerize the conjugated dienes. The amount of catalyst used can vary over a wide range depending somewhat upon a number of factors such as the rate of polymerization desired, temperature employed and other conditions, all of which can be varied considerably. Thus, for example, from about 0.01 to about 5 parts by weight calculated as parts of vanadium trichloride per 100 parts by weight of the monomer to be polymerized can be used to catalyze the polymerization reaction. A more desirable range of from about 0.05 to about 0.5 parts by weight of vanadium trichloride per 100 parts by weight of the monomer to be polymerized is usually employed.

The polymerizations of this invention may be conducted in bulk although they are generally carried out in an inert solvent or diluent which does not adversely affect the polymerization. As is understood by those skilled in the art, it is generally desired to form the catalysts and conduct the polymerizations in the absence of materials which adversely affect the polymerizations, particularly materials which inhibit the activity of the catalyst such as water, oxygen and carbon dioxide. Various solvents and diluents can be used representative of but certainly not limitative of which are liquid aromatic hydrocarbons such as benzene and toluene; hydrogenated aromatic hydrocarbons such as tetralin; liquid aliphatic hydrocarbons such as pentane, heptane, hexane, petroleum ether, decane; and cycloaliphatic hydrocarbons such as cyclohexane, decalin, and cyclooctane. Mixtures of such solvents may be used, if desired. Usually a sufficient amount of solvent used to provide a polymer solids content of from about 5 to about 15 weight percent based on the polymer and solvent to reduce the viscosity of the polymerizate.

The polymerization can be conducted over a wide range of temperatures such as, for example, from about 0°C. to about 100°C., but above the freezing point and below the boiling point of the mixture of solvent and monomer, and preferably from about 25°C. to about 70°C. The polymerization can be conducted at atmospheric pressure or above or below atmospheric pressure. For convenience, the polymerization can be conducted at an autogenous pressure.

In the practice of this invention the oxygen is required to diffuse into the mixture of the polymer and active catalyst, and therefore the rate of reduction of the molecular weight of the polymer is somewhat dependent upon the rate of diffusion of the oxygen. To facilitate the diffusion of oxygen it is preferred to agitate the mixture of oxygen, polymer and catalyst. Because of the relatively high molecular weight of the polymer and the attendant relatively high viscosity of the polymerizate, it is also usually preferred that the polymer and catalyst are diluted with a solvent such as by reacting the monomer in a solvent or by the addition of a solvent to the polymerizate. Thus, it has been found, for example, that as the oxygen diffuses through and mixes with the polymer and active catalyst the inherent viscosity of the trans-1,4 polymers of the conjugated diene hydrocarbons have been reduced at least 50 percent in a matter of about 1 minute or less where the polymer solution is dilute, such as about 5 percent or less by weight solids, and where good agitation is provided at a temperature of about 25°C. The mixture of polymer, active catalyst and solvent, if used, can be treated with oxygen over a wide range of temperatures such as from about 0°C. to about 80°C. but above the freezing point and below the boiling point of the mixture and preferably between about 20°C. and about 50°C. In the treatment, the mixture can be contacted with gaseous oxygen, for example, by adding the oxygen to the atmosphere above the mixture's surface and/or by admitting the oxygen below the surface of the mixture. The oxygen treatment can be carried out at atmospheric or above or below atmospheric pressures. Generally a satisfactory treatment is obtained at about autogenous pressure developed by the mixture under the operating conditions used.

The modified polymers prepared according to this invention can have physical properties ranging from plastic to elastomeric rubber-like properties. The rubber-like polymers can generally be cured by methods known to those skilled in the art, such as by peroxide and sulfur curing, to form highly useful elastomeric materials. Some of the many articles in which the elastomeric materials may be employed are coated and molded articles such as tires, inner tubes, industrial products such as tubes and belts, and various coated fabrics.

In the following examples various experiments are conducted to further illustrate the invention and to show the effect of oxygen as a molecular weight modifier. The inherent viscosities are determined with 0.04 grams of polymer in 200 milliliters of benzene at 30°C. The percent by weight insolubles were determined by measuring the polymer that is insoluble in benzene at 30°C. for 48 hours. The parts and percentages in the examples are by weight unless otherwise indicated.

EXAMPLE I

A reactor was charged under a nitrogen atmosphere with 68 parts of benzene as a solvent and 1.65 parts of 2-ethyl-1,3-butadiene. To this mixture was then charged 1.8 parts of a 0.721 molar solution of triisobutyl aluminum in benene, 0.42 parts of a 0.269 molar solution of titanium tetraisopropoxide in benzene and 0.25 parts of an 0.28 molar suspension of vanadium trichloride in heptane. The mixture was heated with agitation to 50°C. for about 18 hours. The polymerization reaction was stopped by adding 4.4 parts of a benzene solution containing 0.075 parts of an aromatic amine and 0.75 parts of tetraethylene pentamine. The polymer was coagulated by the addition of about 100 parts of methanol. The coagulated product, after drying, was 1.03 parts of a rubbery polymer.

Infrared and nuclear magnetic resonance analysis of polymers made by this procedure detected no structures other than trans-1,4 in the polymers. Thus, a polymer of 2-ethyl-1,3-butadiene was provided having a structure that was essentially all trans-1,4.

The polymer had an inherent viscosity of 9 dl/g (deciliters per gram) as measured in benzene at 30°C. The term "inherent viscosity" as used in this specification, is defined as the $\log_e$ Relative Viscosity)/(grams of polymer/100 milliliters of solution). "Relative viscosity" is the viscosity of the polymer solution at 30°C. divided by the viscosity of the solvent at 30°C. Benzene was used as the solvent.

EXAMPLE II

In a reactor a polymer was prepared by the method of Example I except that after the polymerization of the 2-ethyl-1,3-butadiene for 24 hours, while the polymerization catalyst was still in its active state, 0.051 parts of gaseous oxygen and the polymer-catalyst-solvent mixture was agitated at about 25°C. There was an immediate drop in viscosity of the mixture and a fading of its brown-black color to a pale straw color. About 1 hour after the addition of the oxygen, 4.4 parts of the polymerization reaction stopping mixture was added as in Example I. The polymer was coagulated with methanol as in Example I, yielding 0.88 parts of a rubbery polymer having an inherent viscosity of 2 dl/g.

EXAMPLE III

To a reactor was charged under a nitrogen atmosphere 45 parts of n-pentane as a solvent and 5.44 parts of isoprene. To the reactor was then charged 0.35 parts of an 0.97 molar solution of triethyl aluminum in n-heptane and 0.34 parts of an 0.2 molar titanium tetrachloride vanadium tetrachloride reaction mixture in n-heptane. The mixture was heated with agitation to 50°C. for 44 hours. The reaction mixture was highly viscous. The stopping solution was added according to the method of Example I and required a few hours to diffuse through the reaction mixture and stop the polymerization reaction. The polymer was recovered by methanol as in Example I yielding 4.63 parts of a crystalline polymer having an inherent viscosity of 8 dl/g.

EXAMPLE IV

In a reactor a polymer of isoprene was prepared according to the method of Example III except that after the polymerization of the isoprene for 44 hours, while the catalyst was still in its active state, 0.016 parts of gaseous oxygen was added to the reactor at about 25°C. During about 4 hours of agitation the viscosity of the viscous mixture progressively visibly decreased with with a substantial lightening of its color. About 70 hours after the addition of the oxygen the stopping solution was added to the mixture and the polymer isolated with methanol as in Example III. The product after drying yielded 4.65 parts of a crystalline polymer having an inherent viscosity of 3.1 dl/g.

EXAMPLE V

Using the procedure and catalyst mixtures of Example I, a series of reactors was each charged with 61.1 parts of benzene and 7.12 parts of 2-ethyl-1,3-butadiene. The polymerizations were carried out at 50°C. for 18 hours. Then the polymerization mixtures in several of the reactors were stopped and the polymers isolated as in Example I.

A portion of the remainder of the polymerization mixtures were treated with 0.029 parts of gaseous oxygen and another portion treated with 0.043 parts of gaseous oxygen measured at about atmospheric pressure at about 25°C. by the method of Example II. From about 1 to about 4 hours was allowed during agitation for diffusion of the oxygen through the polymerization mixture. The polymerizate was treated with the stopping solution and the polymers isolated by the method of Examples I and II.

The polymerizations in each of the series of reactors yielded 5.4 parts of a trans-1,4 polymer. The polymers which had received no oxygen treatment had inherent viscosities of from 8 to 10 dl/g. The oxygen treated polymers had inherent viscosities ranging from 2 to 7 dl/g.

Vulcanizates were prepared and tested from several polymers selected from those which had received no oxygen treatment and from those which had received oxygen treatment. For convenience the polymer receiving no oxygen treatment is referred to herein as Polymer A and had an inherent viscosity of 9. The chosen oxygen treated polymers are referred to herein as Polymers B and C and have inherent viscosities of 6 and 4 respectively. Their vulcanizate properties are shown in Table 1. Each vulcanizate was prepared by mixing 100 parts of the trans-1,4-polyethylbutadiene rubber with 6 parts zinc oxide, 4 parts stearic acid, 0.5 parts mercaptobenzothiazole, 3.5 parts sulfur and 0.5 parts tetraethylene pentamine. The vulcanizates were cured at 275°F. between the platens of a hydraulic press at 20,000 pounds ram force with a 4-inch ram. The best cures for curing times ranging between 10 and 20 minutes are shown.

Table 1

| Trans-1,4 Polymer | Polymer Inherent Viscosity | Vulcanizate Properties | | |
|---|---|---|---|---|
| | | 100% Modulus lbs/sq in. | Ultimate Tensile Strength lbs/sq in | Elongation Per cent |
| A | 9 (not oxygen treated) | 100 | 3300 | 750 |
| B | 6 (oxygen treated) | 100 | 2850 | 850 |
| C | 4 (oxygen treated) | 90 | 3100 | 750 |

Thus, in the practice of this invention a method is provided for reducing the inherent viscosity, or molecular weight, of a high molecular weight trans-1,4 polymer of a non-conjugated diene to make it more easily workable. In this example, their physical properties were not substantially reduced. In a similar manner the method of Examples II and IV can be used to substantially reduce the inherent viscosity of the trans-1,4 polymers, and therefore increase the processability and utility of other diene hydrocarbons referred to hereinbefore. The method is particularly useful for the treatment of trans-1,4 polymers of 1,3-butadiene and 1,3-pentadiene.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a polymer of a conjugated diene hydrocarbon which comprises
   A. polymerizing at least one conjugated diene hydrocarbon selected from 1,3-butadiene, 2-methyl-1,3-butadiene, 2-ethyl-1,3-butadiene and 1,3-pentadiene at a temperature in the range of about 0°C to about 100°C to form a polymer having an inherent viscosity in the range of about 5 to about 12 as determined in benzene at 30°C and about 90 to about 100 percent of a trans-1,4 structure in a dilute solution of an inert solvent, containing less than about 5 weight percent monomer, and a catalyst prepared by mixing a vanadium compound selected from vanadium trichloride and the product of vanadium tetrachloride and titanium tetrachloride with at least one organoaluminum compound selected from the group consisting of triethyl aluminum, tripropyl aluminum, triisopropyl aluminum, tributyl aluminum and triisobutyl aluminum and with up to about 3 moles of a titanium compound per mole of the vanadium compound where the titanium compound is selected from the group consisting of titanium triacetylacetonate and titanium compounds selected from the group consisting of titanium triacetylacetonate, titanium tetrapropoxide, titanium tetraisopropoxide, titanium tetra normal butoxide and titanium tetraisobutoxide, wherein the mole ratio of the organo aluminum compound to the vanadium compound is from about 1.5:1 to about 30:1, and the mole ratio of the titanium compound to the vanadium compound is from about 1.5:1 to about 30:1, and
   B. mixing essentially and sufficient gaseous oxygen by agitation with the mixture of polymerized diene hydrocarbon, solvent and active catalyst at a temperature of about 20°C to about 50°C and a mole ratio of oxygen to the aluminum compounds of about 0.25 to about 2.5 to enable a rapid reduction of the polymer's inherent viscosity by at least about 50 percent, wherein said method is characterized by the polymer's inherent viscosity being reduced by at least about 50 percent within about 1 minute at about 25°C with vigorous mixing with oxygen when the polymer concentration is less than about 5 weight percent.

* * * * *